United States Patent
Nakamura et al.

(10) Patent No.: US 12,401,871 B2
(45) Date of Patent: Aug. 26, 2025

(54) VEHICULAR CAMERA

(71) Applicant: Panasonic Automotive Systems Co., Ltd., Kanagawa (JP)

(72) Inventors: Ken Nakamura, Kanagawa (JP); Kazufumi Takeshita, Tokyo (JP); Takeshi Harada, Kanagawa (JP); Yoshiki Usui, Kanagawa (JP)

(73) Assignee: Panasonic Automotive Systems Co., Ltd., Kanagawa (JP)

(*) Notice: Subject to any disclaimer, the term of this patent is extended or adjusted under 35 U.S.C. 154(b) by 0 days.

(21) Appl. No.: 18/632,875

(22) Filed: Apr. 11, 2024

(65) Prior Publication Data

US 2024/0276083 A1    Aug. 15, 2024

Related U.S. Application Data

(63) Continuation of application No. PCT/JP2022/026838, filed on Jul. 6, 2022.

(30) Foreign Application Priority Data

Dec. 17, 2021    (JP) .................. 2021-205327

(51) Int. Cl.
- *H04N 23/51* (2023.01)
- *B60R 11/04* (2006.01)
- *B60R 11/00* (2006.01)

(52) U.S. Cl.
CPC ............. *H04N 23/51* (2023.01); *B60R 11/04* (2013.01); *B60R 2011/004* (2013.01)

(58) Field of Classification Search
CPC .... H04N 23/51; B60R 11/04; B60R 2011/004
(Continued)

(56) References Cited

U.S. PATENT DOCUMENTS

| 10,904,999 | B2* | 1/2021 | Owaki ................ H05K 1/0215 |
| 2015/0029682 | A1* | 1/2015 | Kadoya ............... H05K 9/0064 |
| | | | 361/748 |

(Continued)

FOREIGN PATENT DOCUMENTS

| JP | 2013109188 A | 6/2013 |
| JP | 2013197223 A | 9/2013 |

(Continued)

OTHER PUBLICATIONS

English Translation of International Search Report dated Sep. 27, 2022, for the corresponding International Patent Application No. PCT/JP2022/026838, 6 pages.

*Primary Examiner* — Matthew David Kim
(74) *Attorney, Agent, or Firm* — Seed Intellectual Property Law Group LLP (57) ABSTRACT

A vehicular camera according to one embodiment includes a lens unit, a board, a housing, a ring member, a conductive first shield part, and a conductive second shield part. The lens unit includes a lens barrel in which a lens is arranged. The board is disposed with a sensor that converts light received through the lens into an image signal. The housing accommodates the board. The ring member includes a first opening into which the lens barrel is fitted, and connects the lens unit and the housing. The first shield part is provided to accommodate the board in the housing. The second shield part is arranged between the ring member and the board, includes a second opening having a diameter corresponding to that of the lens barrel, and is electrically connected to the first shield part. The board and the second shield part are electrically connected.

15 Claims, 6 Drawing Sheets

(58) Field of Classification Search
USPC .......................................................... 348/148
See application file for complete search history.

(56) References Cited

U.S. PATENT DOCUMENTS

| | | | |
|---|---|---|---|
| 2017/0129418 A1* | 5/2017 | Koshiba | H04N 7/183 |
| 2018/0216958 A1* | 8/2018 | Park | G06Q 30/0241 |
| 2018/0295262 A1* | 10/2018 | Dellock | G03B 17/02 |
| 2018/0314028 A1* | 11/2018 | Kim | G02B 1/04 |
| 2019/0143907 A1* | 5/2019 | Byrne | H01R 12/716 |
| | | | 348/148 |
| 2020/0178779 A1* | 6/2020 | Komoro | A61B 1/05 |
| 2020/0195822 A1* | 6/2020 | Agawa | H04N 23/52 |
| 2021/0127532 A1* | 4/2021 | Persson | H04N 23/57 |
| 2021/0197733 A1* | 7/2021 | Percival | G03B 17/02 |
| 2022/0217257 A1* | 7/2022 | Conger | H04N 23/57 |
| 2022/0388458 A1* | 12/2022 | Wang | H01R 13/6593 |

FOREIGN PATENT DOCUMENTS

| | | | |
|---|---|---|---|
| JP | 2015210292 A | 11/2015 | |
| JP | 6234572 B2 | 11/2017 | |
| JP | 2018173434 A | 11/2018 | |
| JP | 2019041883 A | 3/2019 | |
| JP | 2019050516 A | 3/2019 | |
| JP | 2020518859 A | 6/2020 | |

* cited by examiner

VEHICULAR CAMERA

CROSS-REFERENCE TO RELATED APPLICATIONS

This application is a continuation of International Application No. PCT/JP2022/026838, filed on Jul. 6, 2022 which claims the benefit of priority of the prior Japanese Patent Application No. 2021-205327, filed on Dec. 17, 2021, the entire contents of which are incorporated herein by reference.

FIELD

Embodiments described herein relate generally to a vehicular camera.

BACKGROUND

In recent years, with the spread of driving assistance systems for vehicles, cameras are increasingly mounted on vehicles. In addition, a camera mounted on a vehicle (hereinafter, also referred to as a vehicular camera) has been required to have noise resistance characteristics as performance of a sensor increases. For example, in order to improve noise resistance characteristics, there is disclosed a technique of covering, in a resin housing that accommodates a board provided with a sensor, a side portion and a bottom surface of the board with a shield (e.g., JP 6234572 B2).

However, because an upper surface of the board is not covered with the shield in the technique described above, it is difficult to suppress noise from the upper surface of the board and thus there is room for further improvement.

The present disclosure provides a vehicular camera capable of improving noise resistance performance.

SUMMARY

A vehicular camera according to an embodiment of the present disclosure includes: a lens unit including a lens barrel in which a lens is arranged; a board on which a sensor configured to convert light received through the lens into an image signal is disposed; a housing accommodating the board; a ring member including a first opening into which the lens barrel is fitted, the ring member connecting the lens unit and the housing; a conductive first shield part provided to accommodate the board in the housing; and a conductive second shield part arranged between the ring member and the board, the second shield part including a second opening having a diameter corresponding to that of the lens barrel, and the second shield part being electrically connected to the first shield part. The board and the second shield part are electrically connected.

DETAILED DESCRIPTION

Hereinafter, embodiments of the present disclosure will be described in detail with reference to the drawings as appropriate. However, unnecessarily detailed description may be omitted. Note that the accompanying drawings and the following description are provided for those skilled in the art to fully understand the present disclosure, and are not intended to limit the subject matter described in the claims.

A vehicular camera according to the present embodiment is, for example, a vehicular camera that is disposed on a vehicle and can be used for driving assistance of the vehicle. The vehicular camera for driving assistance detects an object such as a vehicle, a pedestrian, or an obstacle by image processing by an internal image signal processor (ISP), and plays a significant role in a driving assistance system of a vehicle such as giving a warning to a driver or forcibly stopping the vehicle.

First Embodiment

Figure 1:
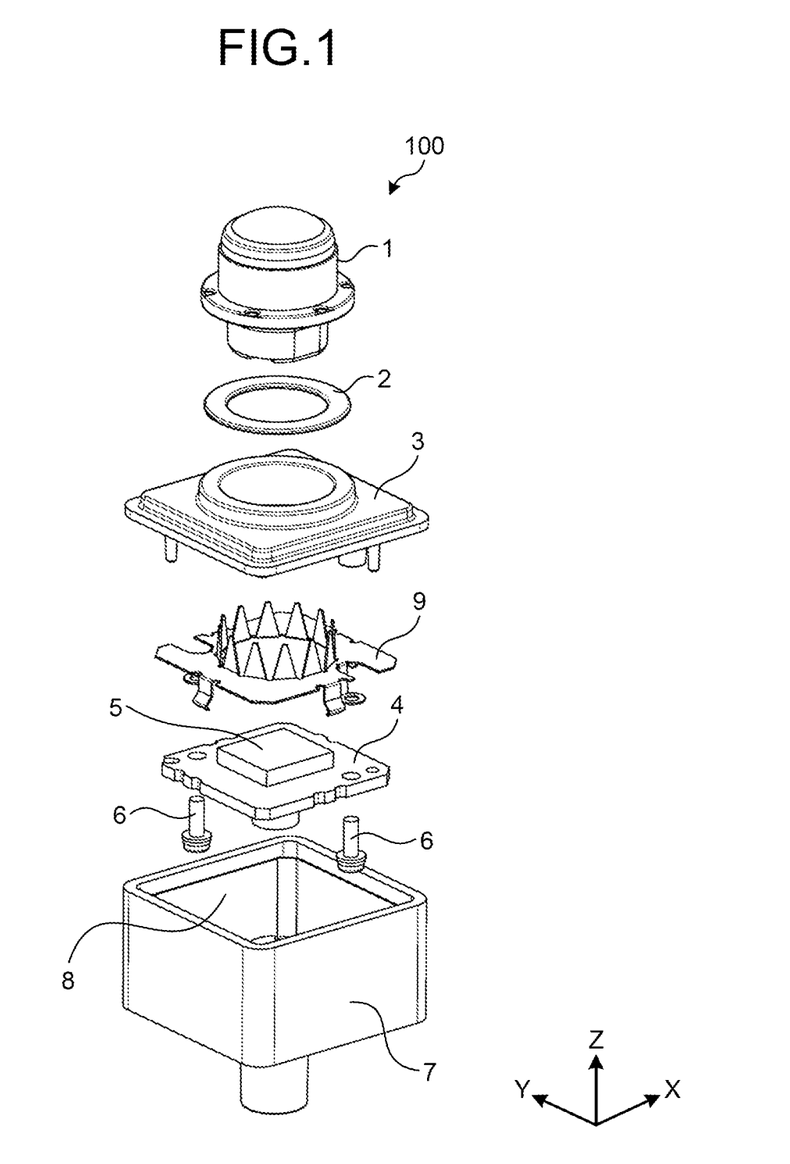
FIG. 1 is an exploded view illustrating an example of a vehicular camera according to a first embodiment.
Figure 2:
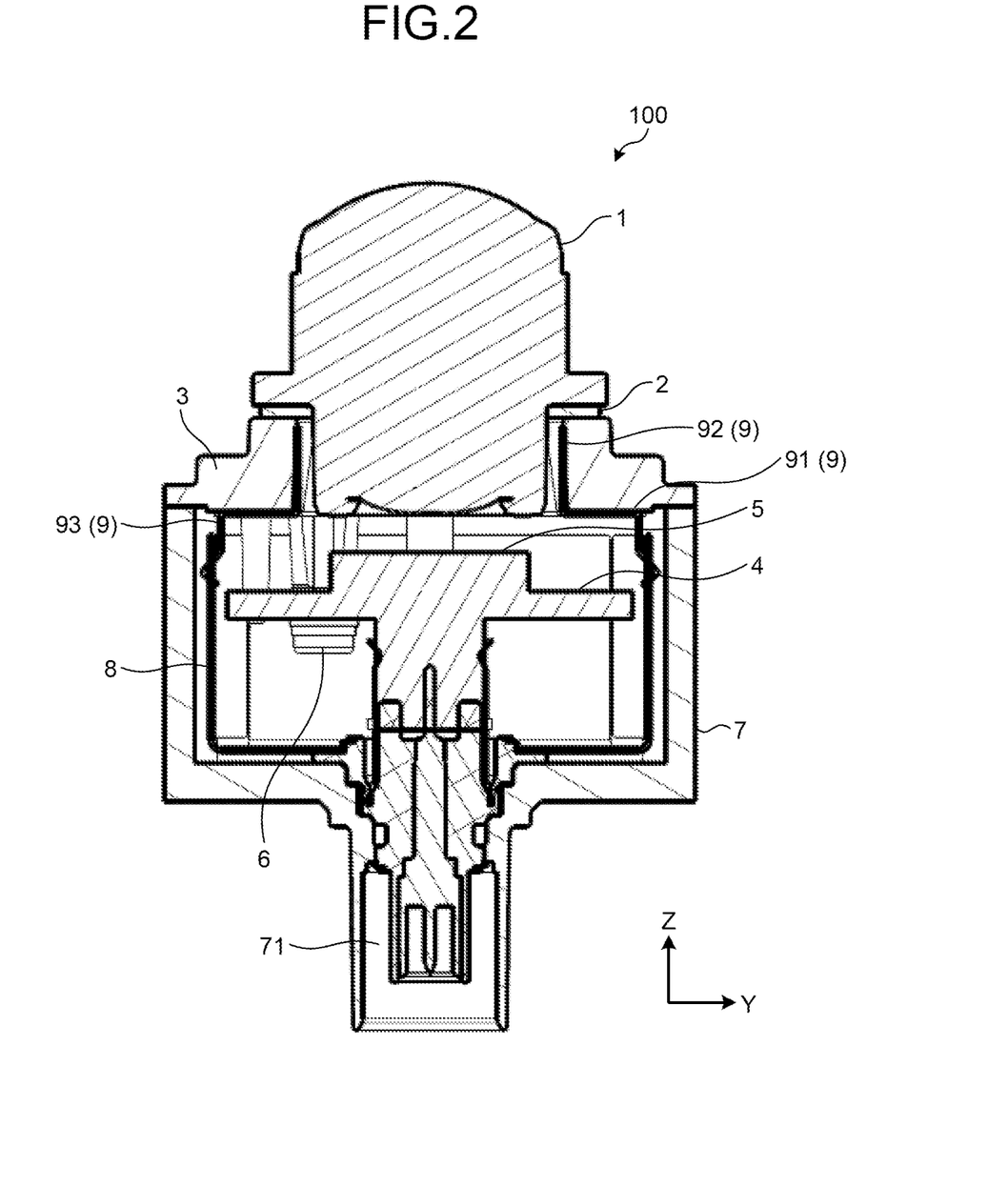
FIG. 2 is a schematic view of a longitudinal section of the vehicular camera according to the first embodiment.
Figure 3:
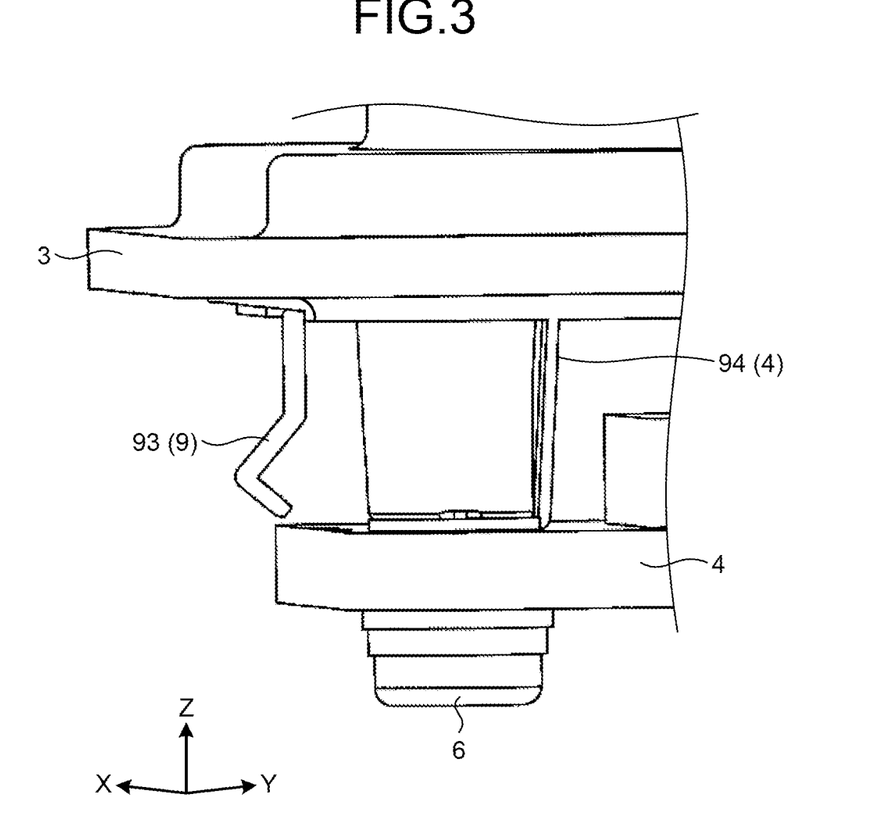
FIG. 3 is a perspective sectional view of the vehicular camera according to the first embodiment.

First, an example of a configuration of a vehicular camera according to the present embodiment will be described with reference to FIGS. 1, 2, and 3. FIG. 1 is an exploded view illustrating an example of the vehicular camera according to a first embodiment. FIG. 2 is a schematic view of a longitudinal section of the vehicular camera according to the first embodiment. FIG. 3 is a perspective sectional view of the vehicular camera according to the first embodiment.

Note that, in the drawings described below, an X axis, a Y axis, and a Z axis orthogonal to one other are illustrated for convenience, and a left-right direction (X direction), a front-back direction (Y direction), and an up-down direction (Z direction) in a vehicular camera 100 of the first embodiment will be described using the X axis, the Y axis, and the Z axis, respectively. Note that in the following description, when simply described as the X direction, the Y direction, or the Z direction, each direction is the respective axial direction and includes two opposite directions.

In addition, when specified as a positive direction of the X axis, the direction is one direction from left to right, when specified as a positive direction of the Y axis, the direction is one direction from front to back, and when specified as a positive direction of the Z axis, the direction is one direction from bottom to top. In addition, when specified as a negative direction of the X axis, the direction is one direction from right to left, when specified as a negative direction of the Y axis, the direction is one direction from back to front, and when specified as a negative direction of the Z axis, the direction is one direction from top to bottom.

The vehicular camera 100 according to the first embodiment includes a lens unit 1, an adhesive member 2, a ring member 3, a board 4, a sensor 5, a fixing member 6, a housing 7, a side shield 8, and a front shield 9.

The lens unit 1 includes a lens barrel and a lens. The lens barrel is a cylindrical member with both ends opened. A lens is arranged at a predetermined position inside the lens barrel. The lens barrel can be formed using, for example, a resin material. The lens is formed of plastic, glass, or the like. The lens is arranged along an optical axis inside the lens barrel and forms an image of light from a subject on a sensor 5 to be described later mounted on a board 4 to be described later. Note that the number of lenses may be one or plural.

The adhesive member 2 is an example of a first adhesive member. The adhesive member 2 is a member that bonds the lens unit 1 and the ring member 3 to be described later. The adhesive member 2 is a member for optical adjustment between the lens unit 1 and the sensor 5 mounted on the board 4.

Here, the optical adjustment using the adhesive member 2 will be described. First, for the lens unit 1, the adhesive member 2 is applied to form an adhesive layer in a position on the ring member 3 to be described later where the lens barrel is to be attached. Next, the lens barrel is attached while checking an image output through an output mechanism 71 of the housing 7 to be described later and performing adjustment for five axes, that is, adjustment of optical axes (X/Y), a focus position (Z), and tilts (θX/θY) of the sensor 5 to be described later by a five-axis adjuster. Specifically, the lens barrel and the ring member 3 on which the adhesive layer is formed in advance are brought close to each other up to a prescribed value.

Next, the lens barrel is moved in the Z direction (optical axis direction of the lens), peaks of a modulation transfer function (MTF) on the optical axis, the center, and the periphery are searched, and an adjustment position is determined based on a calculated value (adjustment of a focus position). Next, position correction is performed in the XY directions (directions orthogonal to the optical axis direction of the lens) to perform optical axis adjustment. Next, the positional relationship between the optical axis direction of the lens and an imaging element is tilted, and tilt (θX/θY) adjustment is performed. Note that the order of the optical axis adjustment is not limited to the order described above.

In addition, in order to perform optical adjustment, the adhesive member 2 preferably has a property of being temporarily cured by, for example, ultraviolet (UV) irradiation prior to main curing by heat treatment. In the present embodiment, it is preferable that the adhesive member 2 is cured through two steps of temporary curing by UV irradiation and main curing by heat treatment. For example, the adhesive member 2 may be an adhesive member including an epoxy resin. As a result, it is possible to prevent the positional relationship between the lens unit 1 and the sensor 5 from being misaligned during the period from the temporary curing to the main curing.

The ring member 3 has an opening into which the lens barrel is fitted, and connects the lens unit 1 and the housing 7 to be described later to each other. Specifically, the ring member 3 accommodates the lens unit 1. The ring member 3 has an opening. The opening is an example of a first opening. Here, the opening enables the lens unit 1 to be accommodated inside the ring member 3, and the lens barrel is fitted into the opening and bonded by the adhesive member 2. In addition, the ring member 3 is provided outside the housing 7. The ring member 3 is, for example, a welding member, and comes into contact with the housing 7 to be described later and is welded to the housing 7 by laser irradiation.

The board 4 is disposed with a sensor 5 to be described later that converts light received through the lens into an image signal. The board 4 is accommodated in the housing 7.

The sensor 5 is disposed on the board 4. The sensor 5 is an imaging element, and is, for example, a complementary metal oxide semiconductor (CMOS) image sensor. The sensor 5 receives light passed through the lens unit 1, forms an image of the received light, and converts the image into an image signal. The sensor 5 is arranged on the optical axis of the lens unit 1. In addition, the sensor 5 generates electromagnetic noise by the operation of the sensor 5. That is, the sensor 5 is a generation source that generates the electromagnetic noise.

The fixing member 6 fixes the board 4 to the ring member 3 by fastening the board 4 to the ring member 3 in the positive direction of the Z-axis direction. The fixing member 6 is, for example, a fixing screw made of a conductive material such as a metal material (as an example, stainless steel).

The housing 7 accommodates inside thereof the board 4 and a side shield 8 to be described later. The housing 7 has an opening. Here, the opening enables the board 4 and the side shield 8 to be accommodated inside the housing 7, and is closed by the ring member 3. The housing 7 is made of a non-conductive material such as a resin material, for example.

In addition, the housing 7 includes the output mechanism 71 that outputs an image signal. The output mechanism 71 is a conductive connection portion to which an electric cable that outputs an image signal to the outside is to be connected, the image signal being a signal output from the sensor 5. The output mechanism 71 is, for example, a coaxial (2-wire type) connector, a shielded twisted quad wire (STQ) (4-wire type) connector, a CAN-containing STQ (6-wire type) connector, or the like.

The side shield 8 is an example of a first shield part. The side shield 8 is provided in the housing 7. The side shield 8 is provided in a manner that the board 4 is accommodated inside the side shield 8 and the side shield 8 surrounds the board 4. Specifically, the side shield 8 is provided so as to face a side surface and a lower surface of the board 4. The side shield 8 is a member that suppresses the electromagnetic noise of the sensor 5.

In addition, the side shield 8 is made of, for example, a conductive material such as a metal material. The side shield 8 is electrically grounded to the output mechanism 71. That is, a potential of the side shield 8 is the same as a ground potential of the output mechanism 71.

Furthermore, the vehicular camera 100 of the first embodiment includes the front shield 9. The front shield 9 is an example of a second shield part. The front shield 9 is arranged between the ring member 3 and the board 4. The front shield 9 is fastened to the ring member 3 and the board 4 in the positive direction of the Z-axis direction by the fixing member 6. The front shield 9 has an opening having a diameter corresponding to that of the lens barrel. The opening is an example of a second opening.

The front shield 9 includes a first member 91, a second member 92, a first contact member 93, and a second contact member 94, which are to be described later. In addition, the front shield 9 is made of, for example, a conductive material such as a metal material.

The first member 91 is provided between the ring member 3 and the board 4. The first member 91 is provided along the XY directions and faces a bottom surface of the ring member 3 and an upper surface of the board 4. The second member 92 is accommodated inside the ring member 3. The second member 92 is a member extending in the positive direction of the Z-axis direction from an end of the first member 91.

The second member 92 is accommodated between a cylindrical outer peripheral surface of the lens barrel of the lens unit 1 and an inner peripheral surface of the opening of the ring member 3, and extends along between the outer peripheral surface of the lens barrel and the inner peripheral surface of the opening of the ring member 3. The second member 92 includes a plurality of plate-shaped protrusions extending in the positive direction of the Z-axis direction along the lens barrel from an edge of the opening (first member 91). The protrusion is formed so as to decrease in size in the width direction from the edge of the opening of the second member to a tip of the second member, for example (as an example, a tapered shape).

The first contact member 93 is provided at an edge of a surface facing the board 4. The first contact member 93 includes a plurality of protrusions extending along the negative direction of the Z-axis direction. The protrusion has, for example, a substantially quadrangular shape, is provided at the edge of the surface facing the board 4, and is bent toward the side shield 8. A part of the first contact member 93 comes into contact with the side shield 8 and is electrically connected to the side shield 8. As a result, the first contact member 93 is electrically connected to the side shield 8 and is grounded. That is, potentials of the side shield 8 and the front shield 9 are the same as the ground potential of the output mechanism 71.

The second contact member 94 is provided on the upper surface of the board 4. The second contact member 94 is a protrusion extending along the negative direction of the Z-axis direction. The second contact member 94 is provided with a hole through which the second contact member 94 is fastened to the fixing member 6. The second contact member 94 is fixed (sandwiched) between the ring member 3 and the board 4 by the fixing member 6. In addition, the second contact member 94 is electrically connected to the board 4 by the fixing member 6. That is, a potential of the second contact member 94 is the same potential as the ground potential of the board 4. The front shield 9 is a member that suppresses the electromagnetic noise of the sensor 5.

As described above, in the vehicular camera 100 of the first embodiment, the front shield 9 is arranged between the ring member 3 and the board 4, has the second opening having a diameter corresponding to that of the lens barrel, is electrically connected to the side shield 8, and has conductivity. As a result, in the vehicular camera 100 of the first embodiment, since the potentials of the side shield 8 and the front shield 9 are the same, it is possible to suppress the electromagnetic noise radiated in the positive direction of the Z-axis direction.

In addition, the front shield 9 is electrically connected to the board 4. As a result, in the vehicular camera 100 of the first embodiment, since the potentials of the board 4 on which the sensor 5 is disposed and the front shield 9 are the same, it is possible to suppress the electromagnetic noise radiated in the positive direction of the Z-axis direction. Therefore, in the vehicular camera 100, the potentials of the board 4, the side shield 8, and the front shield 9 are the same, and the electromagnetic noise radiated in the positive direction of the Z-axis direction can be suppressed. As a result, the noise resistance performance of the vehicular camera 100 can be improved.

Second Embodiment

Figure 4:
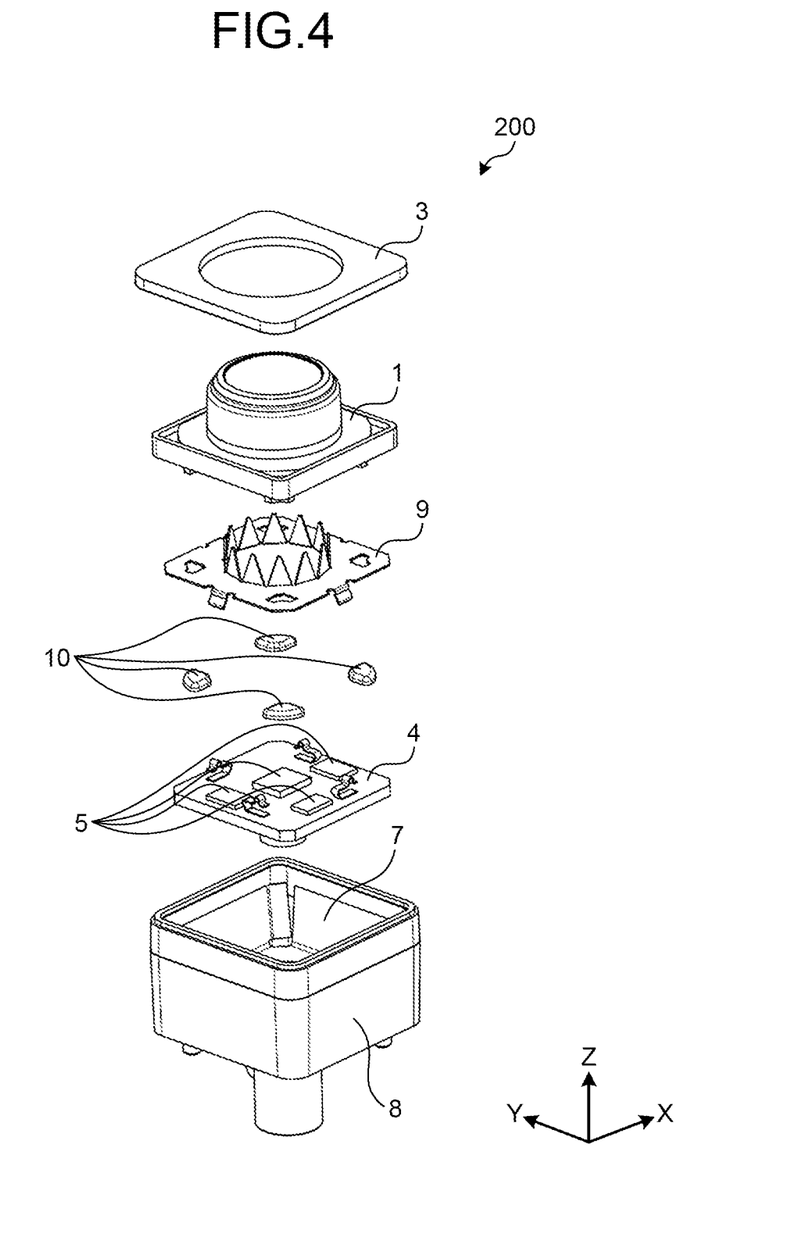
FIG. 4 is an exploded view illustrating an example of a vehicular camera according to a second embodiment.
Figure 5:
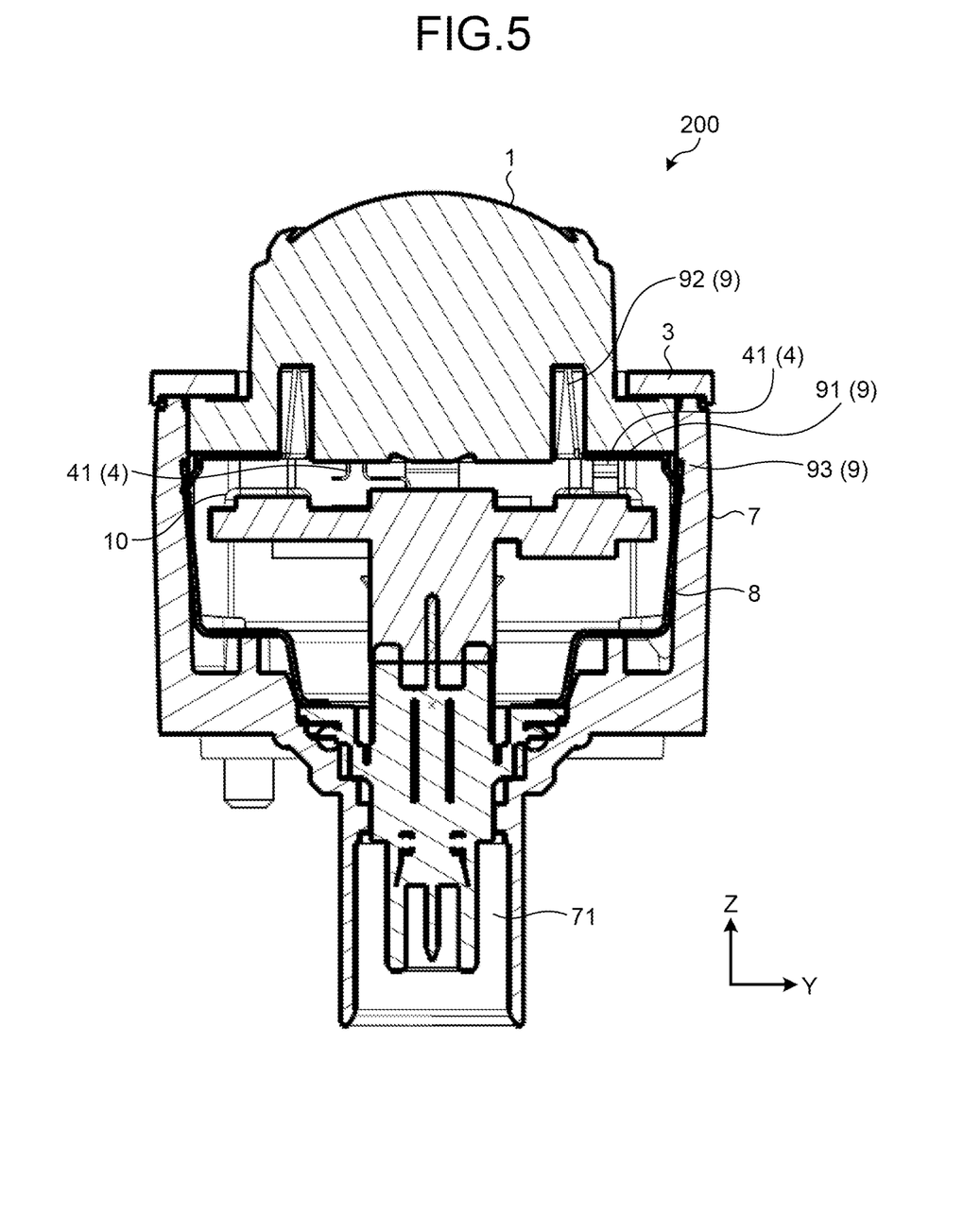
FIG. 5 is a schematic view of a longitudinal section of the vehicular camera according to the second embodiment.
Figure 6:
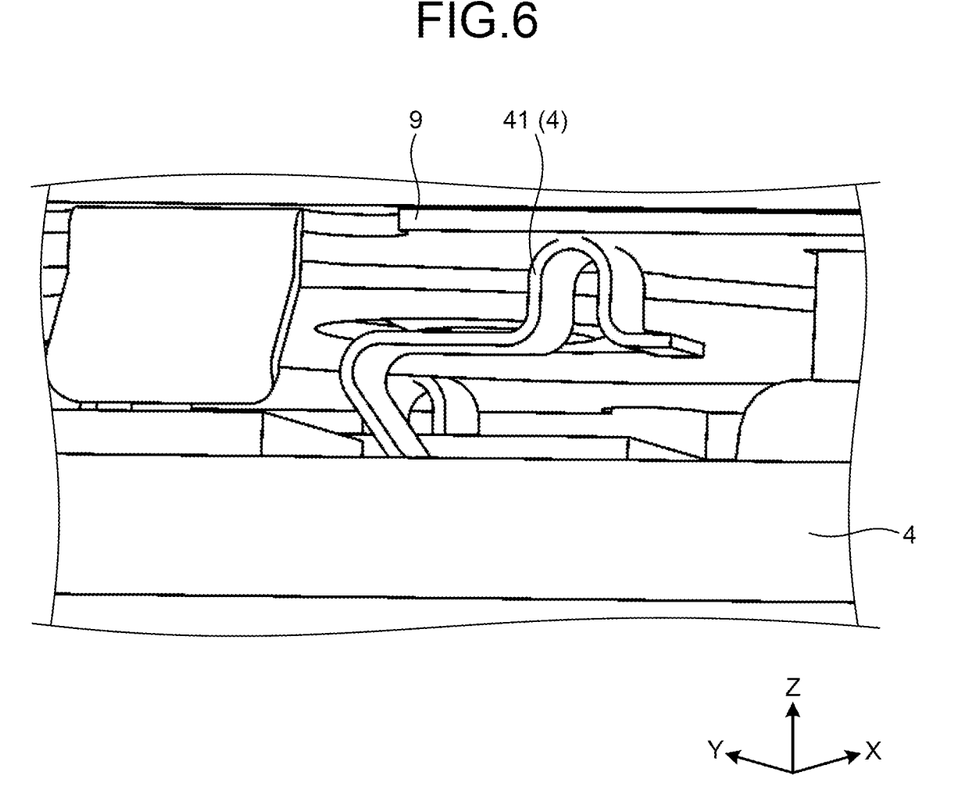
FIG. 6 is a perspective sectional view of the vehicular camera according to the second embodiment.

Next, a second embodiment will be described. FIG. 4 is an exploded view illustrating an example of a vehicular camera 200 according to the second embodiment. FIG. 5 is a schematic view of a longitudinal section of the vehicular camera 200 according to the second embodiment. FIG. 6 is a perspective sectional view of the vehicular camera 200 according to the second embodiment. Description of parts common to those of the first embodiment described above will be omitted as appropriate. Note that constituent elements similar to those in the first embodiment are denoted by the same reference numerals, and description thereof will be omitted as appropriate.

In the first embodiment described above, a mode in which the adhesive member 2 that performs optical axis adjustment is provided between the lens unit 1 and the ring member 3 has been described. In the second embodiment, a mode in which an adhesive member 10 is provided between a board 4 and a front shield 9 will be described.

A lens unit 1 is placed on the board 4 so as to cover a sensor 5, and is fixed to the board 4 using an adhesive member 10 after optical axis adjustment (for example, six axes) of a lens is performed. In addition, the lens unit 1 accommodates the front shield 9 inside a lens barrel of the lens unit 1. A state in which the front shield 9 is accommodated will be described later. Note that in the second embodiment, in optical axis adjustment of the lens, since the adjustment is performed on the board 4 side, in addition to the five axes described above, adjustment for six axes is performed including adjustment of rotation in the Z-axis direction.

The board 4 includes a contact member 41. The contact member 41 is a protrusion extending along the positive direction of the Z-axis direction. The contact member 41 is an elastic contact terminal or the like formed of a conductive material such as a metal material. The contact member 41 is electrically connected to the front shield 9. Specifically, the contact member 41 has a front end in the positive direction of the Z-axis direction coming into contact with the front shield 9, and is electrically connected to the front shield 9.

The front shield 9 is provided between the lens unit 1 and the board 4. A second member 92 of the front shield 9 extends along the inside of the lens barrel of the lens unit 1. The second member 92 is accommodated inside the lens barrel of the lens unit 1 so as to face the inner peripheral surface of the lens barrel.

The adhesive member 10 is an example of a second adhesive member. The adhesive member 10 is provided between the board 4 and the front shield 9. The adhesive member 10 is a member for optical adjustment between the lens unit 1 and an imaging element mounted on the board 4.

As described above, in the vehicular camera 200 of the second embodiment, the front shield 9 is arranged between the ring member 3 and the board 4, has a second opening having a diameter corresponding to that of the lens barrel, is electrically connected to the side shield 8, and has conductivity. As a result, in the vehicular camera 200 of the second embodiment, since the potentials of the side shield 8 and the front shield 9 are the same, it is possible to suppress the electromagnetic noise radiated in the positive direction of the Z-axis direction.

In addition, the front shield 9 is electrically connected to the board 4. As a result, in the vehicular camera 200 of the second embodiment, since the potentials of the board 4 on which the sensor 5 is disposed and the front shield 9 are the same, it is possible to suppress the electromagnetic noise radiated in the positive direction of the Z-axis direction. Therefore, in the vehicular camera 200, the potentials of the board 4, the side shield 8, and the front shield 9 are the same, and the electromagnetic noise radiated in the positive direction of the Z-axis direction can be suppressed. As a result, the noise resistance performance of the vehicular camera 200 can be improved.

According to the vehicular camera of the present disclosure, noise resistance performance of the vehicular camera can be improved.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A vehicular camera comprising:
a lens unit including a lens barrel in which a lens is arranged;
a board on which a sensor configured to convert light received through the lens into an image signal is disposed;
a housing accommodating the board;
a ring member including a first opening into which the lens barrel is fitted, the ring member connecting the lens unit and the housing;
a conductive first shield part provided to accommodate the board in the housing; and
a conductive second shield part arranged between the ring member and the board, the second shield part including a second opening having a diameter corresponding to that of the lens barrel, and the second shield part being electrically connected to the first shield part, wherein
the board and the second shield part are electrically connected, and
the second shield part includes a plurality of plate-shaped protrusions extending from an edge of the second opening of the second shield part along the lens barrel.

2. The vehicular camera according to claim 1, wherein the protrusions of the second shield part extend along between an outer peripheral surface of the lens barrel and an inner peripheral surface of the first opening.

3. The vehicular camera according to claim 2, wherein the protrusions of the second shield part are formed to decrease in size in a width direction from the edge of the second opening of the second shield part to a tip of the second shield part.

4. The vehicular camera according to claim 3, comprising
a fixing member configured to fix the board to the ring member, wherein
the board and the second shield part are electrically connected by the fixing member.

5. The vehicular camera according to claim 3, wherein
the board includes, on a surface facing the second shield part, a second contact member extending toward the second shield part, and
the board and the second shield part are electrically connected by the second contact member of the board.

6. The vehicular camera according to claim 2, wherein
the second shield part includes, at an edge on a surface facing the board, a first contact member extending toward the first shield part, and
the first shield part and the second shield part are electrically connected through the first contact member of the second shield part.

7. The vehicular camera according to claim 2, comprising
a fixing member configured to fix the board to the ring member, wherein
the board and the second shield part are electrically connected by the fixing member.

8. The vehicular camera according to claim 2, wherein
the board includes, on a surface facing the second shield part, a second contact member extending toward the second shield part, and
the board and the second shield part are electrically connected by the second contact member of the board.

9. The vehicular camera according to claim 1, wherein the protrusions of the second shield part are formed to decrease in size in a width direction from the edge of the second opening of the second shield part to a tip of the second shield part.

10. The vehicular camera according to claim 9, wherein
the second shield part includes, at an edge on a surface facing the board, a first contact member extending toward the first shield part, and
the first shield part and the second shield part are electrically connected through the first contact member of the second shield part.

11. The vehicular camera according to claim 9, comprising
a fixing member configured to fix the board to the ring member, wherein
the board and the second shield part are electrically connected by the fixing member.

12. The vehicular camera according to claim 9, wherein
the board includes, on a surface facing the second shield part, a second contact member extending toward the second shield part, and
the board and the second shield part are electrically connected by the second contact member of the board.

13. The vehicular camera according to claim 1, wherein
the second shield part includes, at an edge on a surface facing the board, a first contact member extending toward the first shield part, and
the first shield part and the second shield part are electrically connected through the first contact member of the second shield part.

14. The vehicular camera according to claim 1, comprising
a fixing member configured to fix the board to the ring member, wherein
the board and the second shield part are electrically connected by the fixing member.

15. The vehicular camera according to claim 1, wherein
the board includes, on a surface facing the second shield part, a second contact member extending toward the second shield part, and
the board and the second shield part are electrically connected by the second contact member of the board.

* * * * *